(12) United States Patent
Samid (10) Patent No.: US 11,548,309 B2
(45) Date of Patent: Jan. 10, 2023

(54) DOQUMINT TECHNOLOGY: COUNTERFEIT RESISTANT DOCUMENTATION

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 0 days.

(21) Appl. No.: 17/372,482

(22) Filed: Jul. 11, 2021

(65) Prior Publication Data

US 2021/0402822 A1 Dec. 30, 2021

Related U.S. Application Data

(63) Continuation-in-part of application No. 16/915,938, filed on Jun. 29, 2020, now Pat. No. 11,062,279.

(51) Int. Cl.
*B42D 25/20* (2014.01)
*G06K 7/10* (2006.01)

(52) U.S. Cl.
CPC ......... *B42D 25/20* (2014.10); *G06K 7/10237* (2013.01)

(58) Field of Classification Search
CPC ............................ B42D 25/20; G06K 7/10237
See application file for complete search history.

(56) References Cited

U.S. PATENT DOCUMENTS 11,062,279 B2 * 7/2021 Samid .................... G07F 7/0873
11,182,726 B2 * 11/2021 Koenig ................. H04L 9/3297

* cited by examiner

*Primary Examiner* — Seung H Lee (57) ABSTRACT

Manufacturing a counterfeit resistant document as a randomized assembly of material constituents with a large variety of electrical conductivity attributes, thereby achieving a unique set of physically measured properties of the document, so that a document verifier will be convinced of the authenticity of the document by comparing the results of real time measurements with measurements pre-recorded in a public ledger.

10 Claims, 10 Drawing Sheets

Fig.-1 Doqument Reader

Quantum Randomness Guided
Doqument Production

Fig.-4

Quantum Randomness Guided
Counterfeit Resistant Doqument

Fig.-5

Quantum Randomness Guided
doping of Conductive Polymers

Fig.-6    Seeded Rock

Fig 7

Location Flexible Doqument

Fig.-8

Page Doqument Authenticator

Fig.9

Page Doqument Authenticator

Fig.10

Rich Data Content Doqument

Fig.-11

Fig.-12  One and Two Sided Doquments

Fig.-13

Multi Layer Doqument

Fig.-14

Randomized Polygon

Fig.-15

Randomized Polygons as Background Layer

DOQUMINT TECHNOLOGY: COUNTERFEIT RESISTANT DOCUMENTATION

CROSS REFERENCE TO RELATED APPLICATIONS

Application Ser. No. 16/915,938 is a Continuation in Parts of U.S. patent application Ser. No. 16/578,341; which is a continuation in parts of application Ser. No. 15/898,876; based on which this application references Provisional Application No. 63/034,401 filed on Jun. 4, 2020; Provisional Application No. 63/005,062 filed on Apr. 3, 2020; Provisional Application No. 62/963,855 filed on Jan. 21, 2020; Provisional Application No. 62/931,807 filed on Nov. 7, 2019; Provisional Application No. 62/926,560 filed on Oct. 27, 2019; Provisional Application No. 62/900,567 filed on Sep. 15, 2019; this application claiming priority via Provisional Application 63/140,006 filed Jan. 21, 2021.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The rising wave of computer fraud has created a dire need to reliably authenticate digital entities via a tie-in with unhackable material attributes. The applications continued herein (U.S. patent application Ser. Nos. 15/898,876, 16/578,341, 16/915,938) describe such 'material cryptography', and this invention extends the continued applications towards manufacturing counterfeit resistant documents.

BRIEF SUMMARY OF THE INVENTION

The randomized resistance technology captured in application Ser. No. 15/898,876 (now U.S. Pat. No. 10,467,522) has been extended to a new class of use, as captured in US patent application Ser. No. 16/578,341, which is a continuation in part of the first. Same technology was extended again, as described in application Ser. No. 16/915,938. This invention describes yet another novel use of the same basic technology, and is a continuation in parts of its predecessor applications. Proposing to manufacture official documents on the basis of the randomized technology used for wallets. This will embody the counterfeit resistance technology to flat 2D documents that would be readily readable and instantly verifiable, allowing for effective crowd handling in situations where identities are monitored.

US PATENT APPLICATION SPECIFICATION

Review: Document counterfeiting technology by and large caught up with government and industry documentation production technology, leading to a flood of counterfeit identity cards, licenses, permission documents, and other important documentations needed for proper governance. Proposing to solve this problem by constructing documents based on quantum randomness—the Doqumint technology (based on U.S. patent application Ser. No. 16/915,938). The resultant "Doqument" will not be anticipated even by a fraudster equipped with a quantum computer. An instant document authenticator will determine the validity of the examined document, and read its data electronically with utmost confidence in the integrity of the read data. The constructed Doqument resists duplication, as much as it enables quick validation.

EXPLANATION OF DRAWINGS

The figure shows a license document to be fit on a Doqument authenticator. The reader measures various conductivity configurations through an array of conductivity ports. The reader also has data ports to read the license data that is captured in an internal data box in the license Doqument. This internal data "chip" may contain more data than is visible in the license Doqument upon casual examination.

The figure shows an individual presenting an access license to a Doqument reader. The Doqument reader authenticates the license as genuine, then reads from its doqument internal data box its contents, including biometric parameters of the rightful owner of this license. The approaching individual then lays his palm on a palm reader connected to the Doqument reader. The reader then compares the 'field palm reading' to the palm signature indicated in the access license Doqument. If the two readings agree then the Doqument reader signals to an automated gate to open and admit the bona fide claimant of the license. It keeps the individual out otherwise. The high credibility of the Doqument projects into high credibility of this access admission procedure.

This figure shows the Doqumint where a source of quantum randomness QR (or randomness of lesser quality) is fed into a Doqumint, comprised of a 3D printer which is fed from a battery of 8 distinct polymers, which have been prepared such that each polymer has a different conductivity. The QR source determined at each step of the 3D printing which polymer is being used for the printing. The output of the Doqumint is the Doqument.

The figure shows an examiner passing a Doqument through the slit of a Doqument reader. As the card document is swiped, it is being both authenticated via various conductivity measurements, and being read—its internal data chip is drained into the reader where it is being displayed on the hand held reading device used by the examiner.

The figure shows polymer doped with conductivity-altering atoms or molecules, such that the overall conductivity of an inspected polymer section is of a particular value.

This figure shows how a semi-conductor substrate, drawn in grey throughout the rectangle that represents the Doqument is seeded by insulators depicted as white areas embedded in the substrate, as well as efficient conductors represented as black areas in the substrate. The distribution of such conductivity-modifying agents determines the effective conductivity measured via a given set of opposite electrical poles. This is a different way of constructing a doqument. Rather than assembling zones of different conductivity, here one uses an underlying substrate of middle range conductivity, then modifies the measured conductivity by a randomized distribution of different-conductivity elements which are of various and randomized sizes various and randomized shapes, and various and randomized locations.

This figure represents an embodiment of the rock of randomness technology over a page or other Doquments which are overlaid on the Doqument authenticator's port without exact precision. The figure shows a page where the "background" is constructed from an insulator, or a very poor conductor, marked with a 1000 as measure of electric resistance. The page is also put together with 10 additional zones, each with a characteristic electrical resistance. There are 5 zones of very good conductors, (resistance 1 in the same units for which the background has resistance 1000). These 5 circular zones represent the area where the conductivity measuring ports will touch the page (the Doqument). The diameter of these circles, shown as 'd' represent the tolerance area. The doqument authenticator electric port can touch the page anywhere in the circles, without having any disturbing impact on the measurement of the effective conductivity. That is because beyond the high conductivity-circle for each port there is a section of much higher resistance. The figures shows resistance values: 40, 30, 50, 20, 100. So if one measures the page resistance between port marked a and port marked b, the result will be about the average, 35=0.5(30+40). Regardless of where exactly the electrode touches around the port. The resistance measured between port e and port d will be between 20 and 100. These readings will not change much if the respective ports will move within the high conductivity d-circle for the port area. That is because of the very low resistance of the circular area.

This figure shows a Doqument featuring a picture of its bearer and some information of relevance and consequence. The page is about to be laid on a Doqument authenticator. The authenticator inspection plate is shown dotted with a authentication ports. The contraption also features a see-through cover to keep the page tight in place for a reliable authentication.

This figure shows a similar setting to FIG. 8 only that the Doqument contains some embedded information which is not visible upon plain examination. When the page is laid upon the authenticator/reader, it is being authenticated and right away (if the document is found bona fide) the contraption reads the data chip embedded in the page Doqument, and displays it on the folded screen. In this case the facial picture of the Doqument bearer is not visible upon simple examination, but is visible on the screen. The screen could put in different configuration on the Doqument authenticator/reader.

The figure shows a Doqument with a data chip embedded. The data chip is shown in the upper section of the figure. It has 'dove tails' shape to indicate strong embedding of the chip in the surrounding 'rock of randomness'. The interface between the data chip and the surrounding rock may be tightly glued so that it would be possible to gently break off the rock, insert a different chip, and then gently put the rock together again so that it measures right and is authenticated by a Doqument authenticator. Of course, the dove tail shape is one example. The greater the interface area between the data chip and the surrounding rock the more difficult is to engineer a counterfeit. The figure shows a downward arrow though which the data from the chip is transferred to the apparatus that authenticates and reads the Doqument. The chip is manufactured via a write-once, read-many technology so that its content cannot be over written through the reading channel. The middle section of the figure shows the authentication port as they touch the Doqument from the bottom. Each port at the bottom surface of the Doqument is the terminal point of a conductive wire that ends up in a random location within the rock of randomness. The randomized pathways and randomized end points are shown. The lowest part of the figure shows the various conductivity zones as they are randomized over the volume of the rock.

The figure shows three degrees of resolution over the same Doqument surface and the same layout of conductivity ports. In design (a) some 4 ports share the same conductivity media in one case, three ports share another media element, etc. This reduces the randomness of the readings. In design option (b) no two ports fully share a conductivity media, and clearly not in design option (c). Yet the high resolution case (c) leads to equalizing randomization that would seem as if the surface is painted with one conductivity media which is the average conductivity of all the conductivity ingredients that part take in building the surface.

This figure shows at the top part a Doqument where the content is written on the dark black part. The conductivity surface is painted on top the black marked area. Also a few ports are shown, some connected to the negative side of a battery some to the positive side. In the middle section, a Doqument is depicted where the conductivity media is pained on both sides and ports appear on both sides, allowing for measurements both at the top and at the bottom. The bottom part shows the content part pierced with holes that are filled with conductivity media so that the screen is read between ports fitted on the top surface and ports fitted on the bottom surface. There may also be a mix. Greater variability and complexity is achieved through the current connection between the upper and bottom surfaces.

The content part of the &dg is depicted as a dark area at the bottom of the drawing. The conductivity varied media ingredients are marked as a three layered set up, and the ports are stuck to random depth in the three layers. This adds complexity and makes it difficult to map the doquement.

This drawing shows how a random number generator will construct a randomized polygon. an arbitrary line L1 is drawn. At an arbitrary point on L1, the end of another line, L2 is placed. A random number generator (RNG) is selecting a randomized angel a to steer L2 off the direction of L1, the length of L2 (|L2|) is randomly selected. At its other end, L3 is marked by selecting a randomized angle b off the direction of L2. The new line, L3 is or randomized length |L3|, and then the process repeats itself with randomized angle c, leading to line L4 of randomized length |L4|, then to angle d for L5 and angle e for L6. At the randomized end of L6 one places the closing line X that closed the shape to a randomized polygon. The number of edges (7 in this example) is also selected randomly, In the general case this successive add on of sides of randomized lengths and randomized angles will create a string of connected polygon. All the randomized polygon may share a conductivity media.

This figure shows randomized polygons placed on a conductivity surface with a background conductivity surface, so that there is a current between any collection of positive ports and negative ports.

IDENTIFICATION OF THE PROBLEM/OPPORTUNITY

Figure 1:
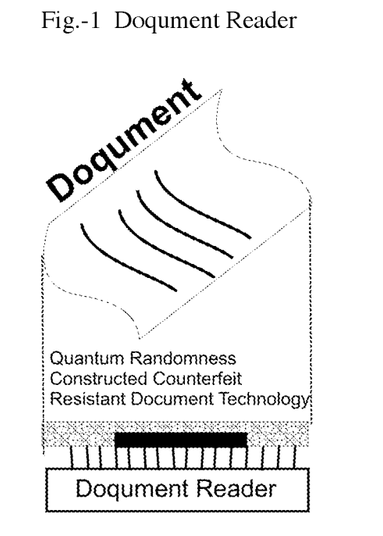
FIG. 1 Doqument Reader
Figure 2:
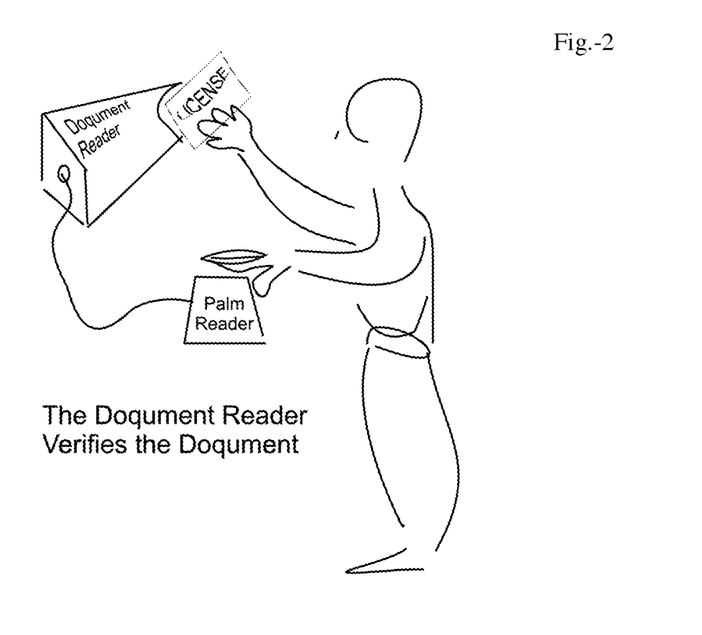
FIG. 2 Doqument Automatic Access Control
Figure 3:
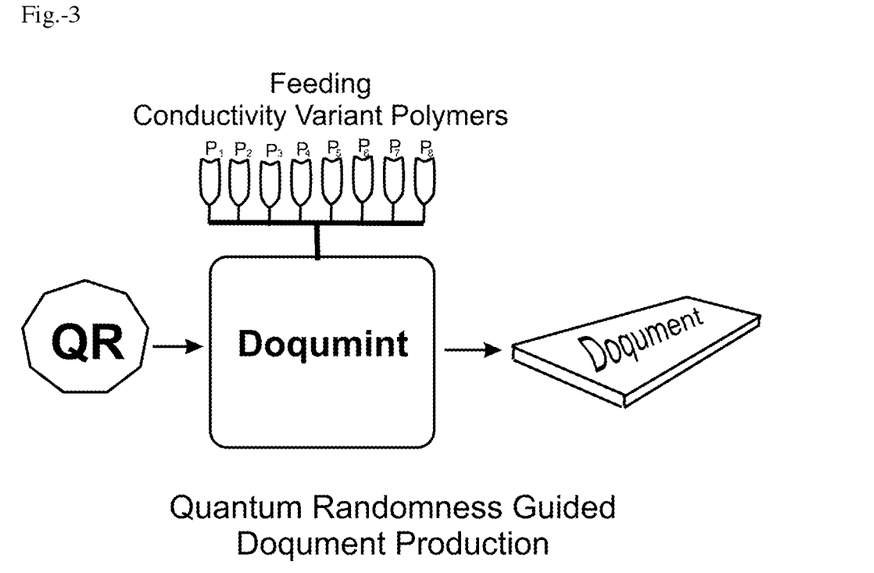
FIG. 3 Quantum Randomness Guided Doqument Production
Figure 4:
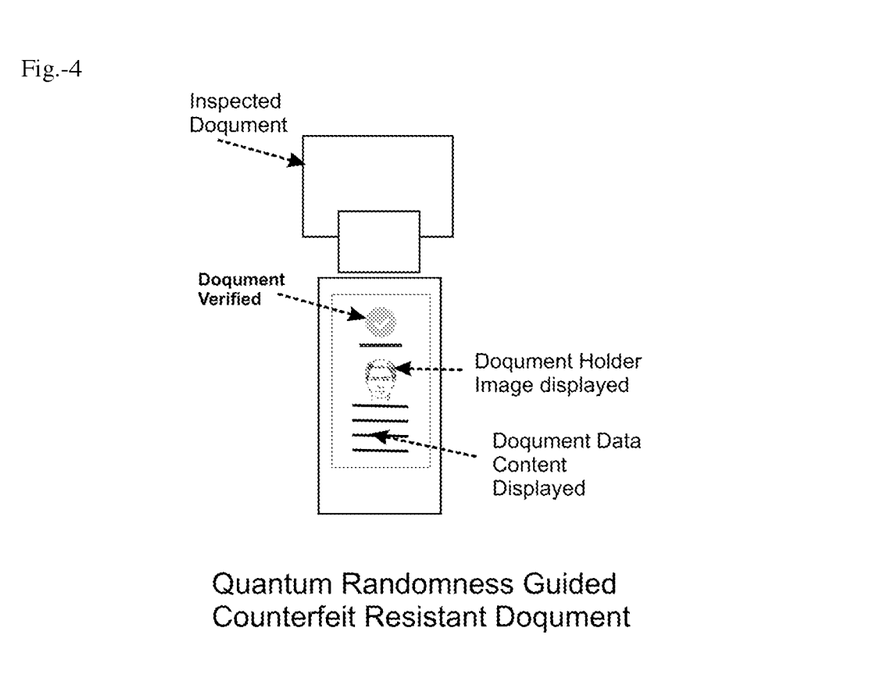
FIG. 4 Hand Held Doqument Authentication and Reading
Figure 5:
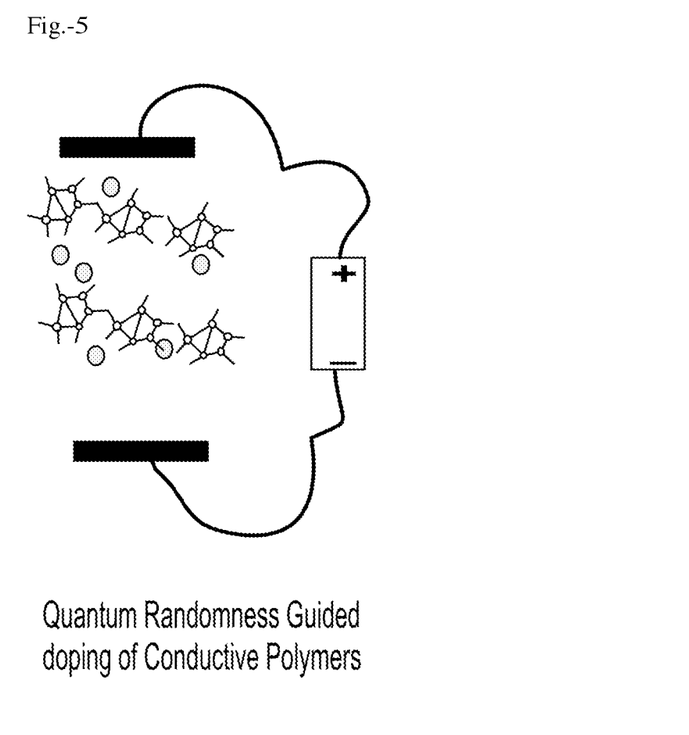
FIG. 5 Quantum Randomness Guided Doping of Conductive Polymers
Figure 6:
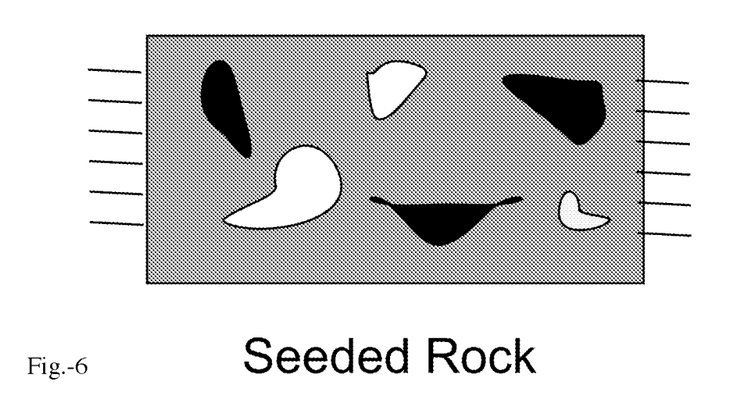
FIG. 6 Seeded Rock
Figure 7:
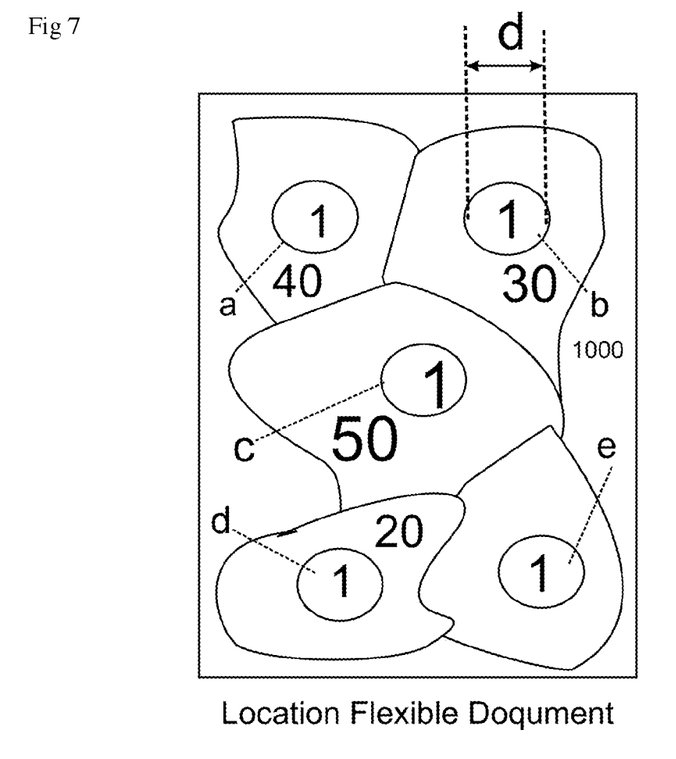
FIG. 7: Location Flexible Doqument
Figure 8:
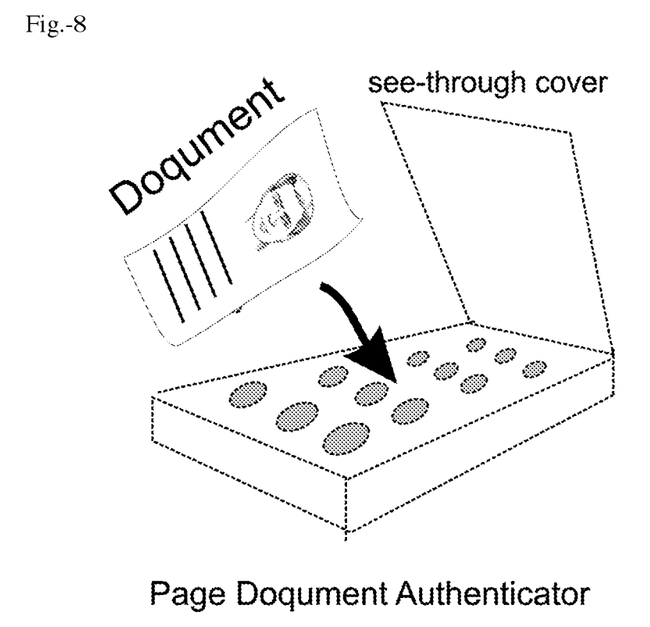
FIG. 8 Page Document Authentication
Figure 9:
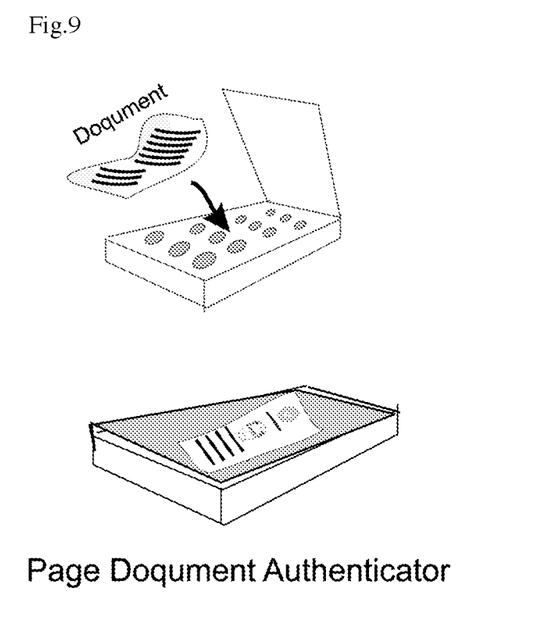
FIG. 9: Page Document Authenticator/Reader
Figure 10:
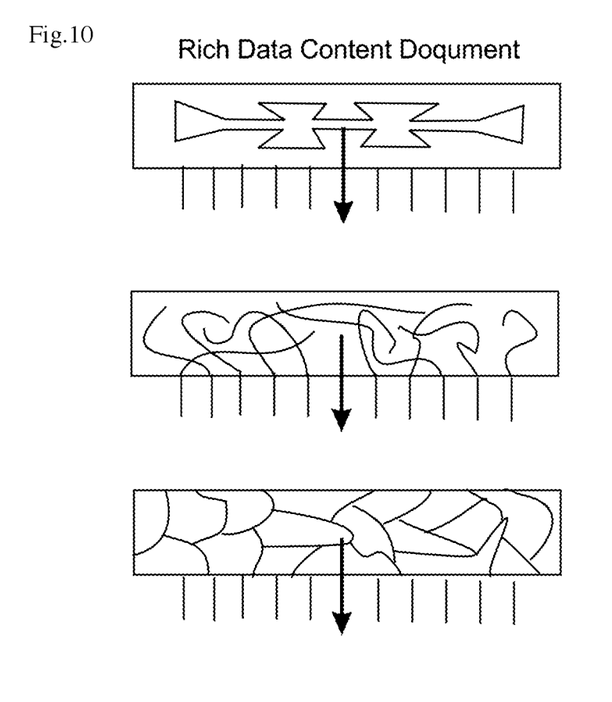
FIG. 10: Rich Data Content Doqument
Figure 11:
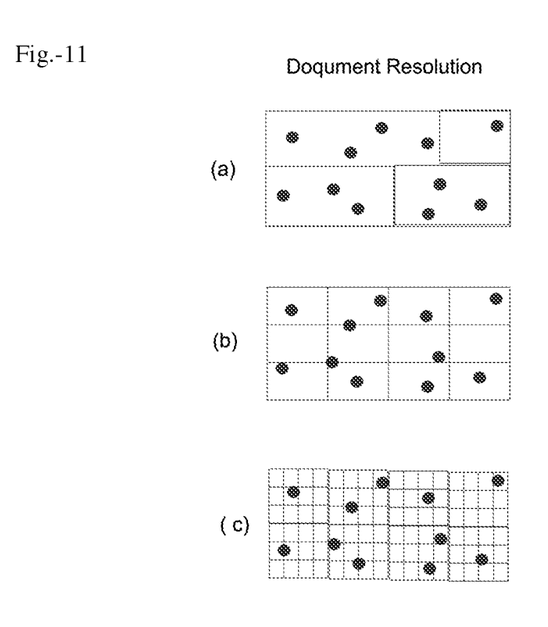
FIG. 11 Doqument Resolution
Figure 12:
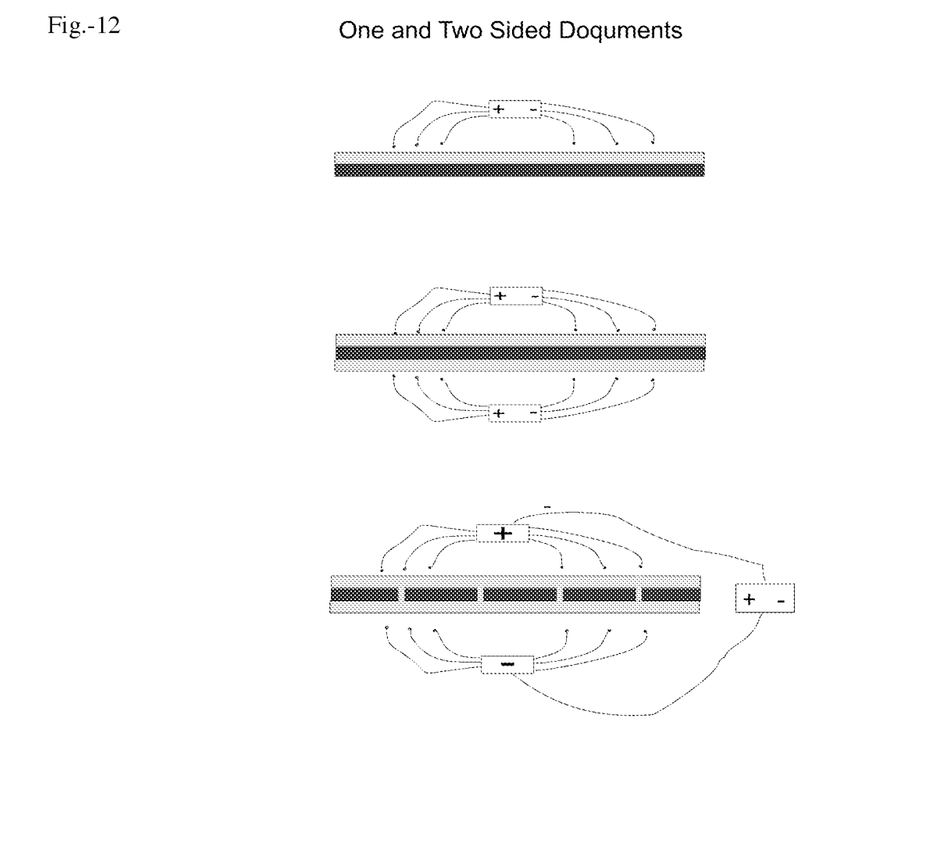
FIG. 12 One and Two Sided Documents
Figure 13:
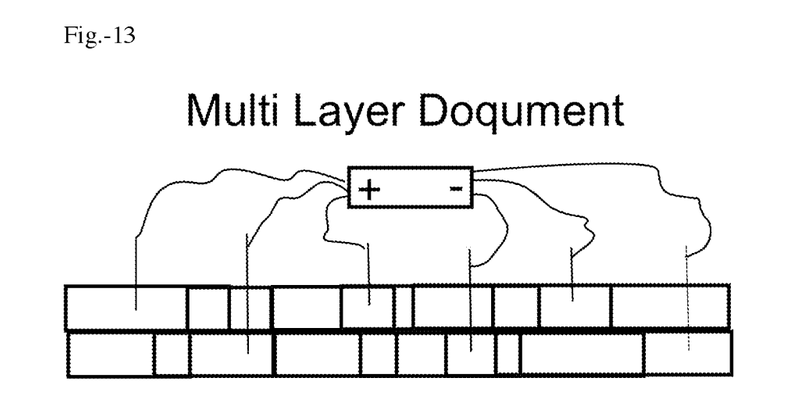
FIG. 13 Multi Layered Document
Figure 14:
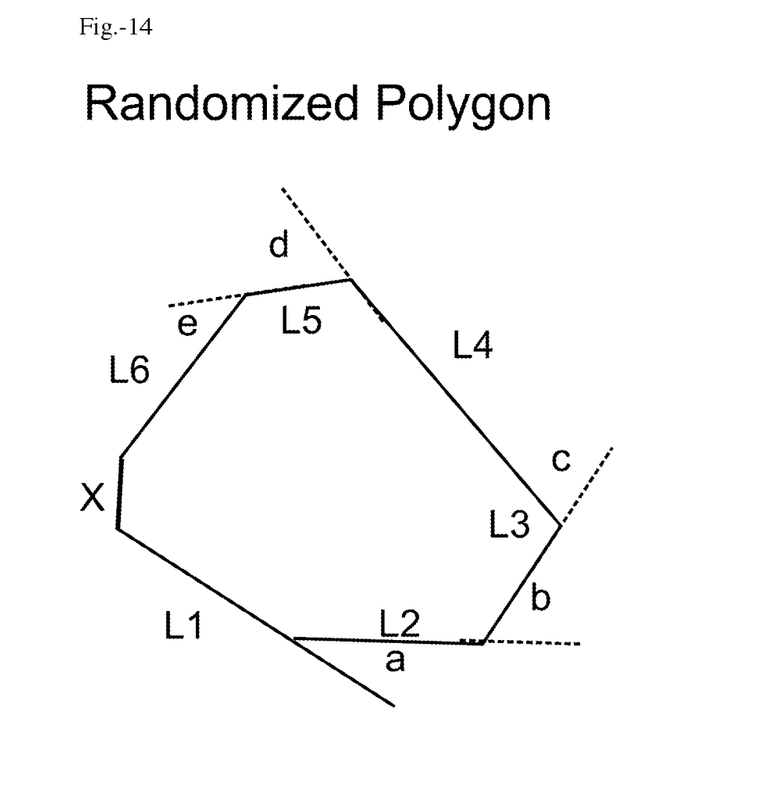
FIG. 14 Randomized Polygon
Figure 15:
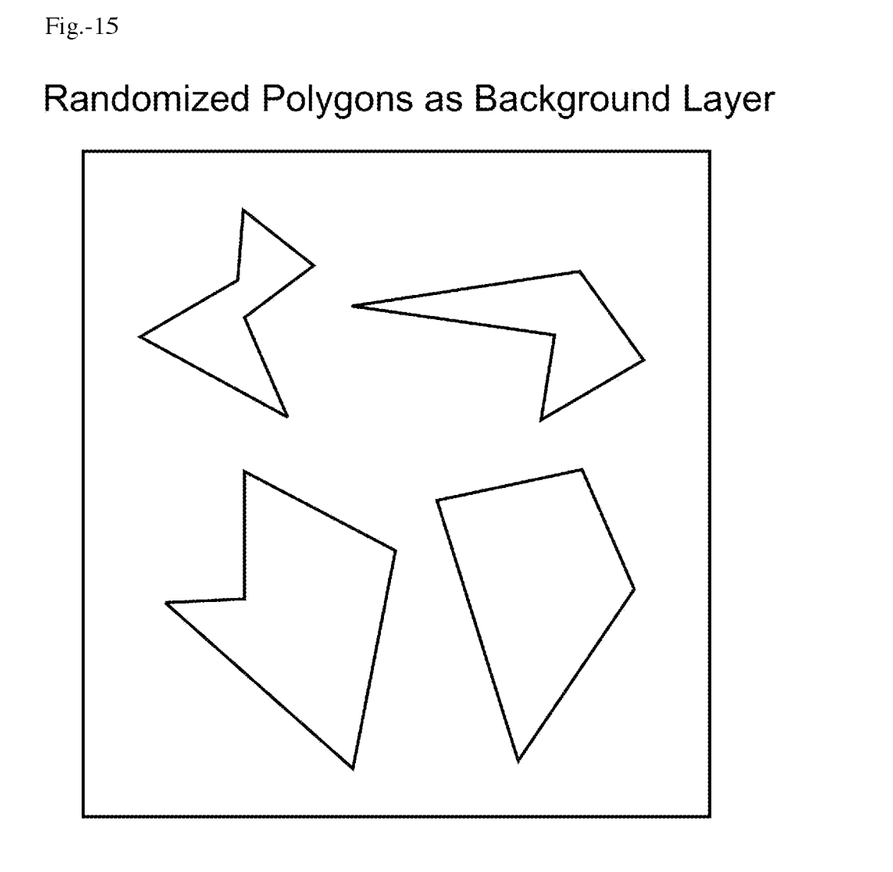
FIG. 15 Randomized Polygons on a Background Layer

High quality color printers, 3D printers, laminators, pressers, and similar document production technology is now widely available through commercial channels. The government and other authorities in need for a system of trusted documentation find it increasingly hard to maintain an edge over an ever-growing, ever more sophisticated community of counterfeiters. What is more, a typical document is inspected under pressure, often by a tired and overworked examiner who can easily OK a smart counterfeit. The damage to good governance is incalculable. Ranging from petty infractions, illegal access, identity theft, harmful entry into secure systems, and other sensitive facilities. The offenders are ranging from harmless playful individuals to well oiled well-funded nation state crews.

While governments are reluctant to admit document fraud statistics, the number of infractions is very high and growing. In some cases a fraudulent document earned the fraudsters high value access credentials to top-secret government database. The need to stop the rising tide of counterfeiting is pressing and acute.

The documents involved range from government issued identity cards, government issued licenses, certification of use, proof of passing inspection, show of ownership, etc. The document may be credit card size or a normal 8.5×11 inch page.

Before opting for a solution to this documentation-counterfeiting problem, one would strive to understand why is it such a big problem, and getting worse. Careful analysis will point to the shrinking technology gap between the tools available to the government to manufacture the documents it needs, and the technology available to the counterfeiters of the same. Since the government manufactured documents are generally widely distributed, it is not difficult for the counterfeiters to get hold of a government issued document and to figure out how to manufacture an exact look alike, at least to the degree sufficient to confuse a rushed field examiner.

When it comes to printed money, the stakes are exceedingly high, and the government deploys very sophisticated, very expensive and delicate technologies to hinder counterfeiting. But the same cannot be used when access cards are issued to contractor's employees to work in a government facility. The simpler manufacturing technology also simplifies the challenge for the counterfeiter.

The state of the art for low and medium sensitivity documents is a variety of colors, shapes, and esoteric document materials. At time holography is used, or smart lamination. These means makes it more difficult on the counterfeiter but are no inhibition.

The hard wallet solution is not based on technology advantage, but on a novel idea: construction guided by quantum randomness. The resultant hard wallet has features which cannot be expected by any would be counterfeiter. The so constructed product is readily measured through a large number of parameters. Since the input that guided the construction was random, so are the results of the measurements. These measurement results are then brought to the awareness of the community of inspectors and validators. These inspectors also measure the product and compare their measurements to the manufacturer measurements. If the two sources agree, the product is authenticated.

So described the strength of the method is based on unexpected, unanticipated, unpredictable nature of the measurements on account of the randomized input. This is a compelling argument, however, it offers a troubling weakness. If the factory measurements leak to the counterfeiter, then they will know how to construct a fake product that will measure as expected.

On further examination of the technology used to construct a quantum randomness guided hard wallet one finds that it is infeasible to construct a product that would fit into a set of known factory measurements. This infeasibility is the cornerstone of the hard wallet, since the wallet must be used to pay any payee, who in turn would require access to the government measurements. Indeed, the hard wallet solution is based on a public ledger featuring the results of the various product measurements. By adapting this solution to the document space, the government will be able to publish results for its documents, and any inspector of the same would be able to quickly measure a document submitted for authentication, and make on spot determination as to the authenticity of the document.

The striking similarity between the hard wallet challenge and the document challenge leads to adopting the same basic technology by adjusting it to the unique parameters of the document as opposed to a wallet.

Such adaptation will have to take into account (i) the dimensions of a document relative to a wallet, and (ii) the use of a document as a source of information, not as a payment device. These two distinctions resulted in a conceptual design, the detailed level of which is now being submitted for funding in phase I.

The use of the proposed technology in this context is discussed right after a brief description of the technology per se.

Doqument Technology

Constructing a document from a set of polymers $P_1$, $P_2$, ... $P_n$, which are seeded with different types and quantities of metals and other elements, so as to create a span of electrical conductivities spreading among the polymers. The lowest conductivity, $C_1$, the next conductivity is $C_2$, and the most conductive polymer is of conductivity $C_n$. A commercial source of quantum randomness, QR, is used to effect a 3D printing of a thin flat layer, such that the polymers are cast in various size blocks throughout the printed layer, "Page". In one version the page may be normally printed to make its information content readable in parallel to the polymers' signature. In another version the document information will be encoded into a thin chip embedded in the page and extracted from it (electronically) for display on the page examiner's station. The CHIP comprising written-once data.

The 3D printing of the n polymers is carried out over p thin conductivity wires that extend from a wire-port on one surface of the printed page into a randomized locations throughout the surface.

The back surface of the doqument is fitted with data (content) reading port through which the data content of the embedded CHIP can be communicated to the reader. Also the p conductivity wires in the doqument end up in p contact points so it is possible to assign to each wire an electric pole.

The authenticator of the document will select q<p ports to be connected to one pole of a battery, and other r≤p−q poles, the authenticator device will connect to the opposite pole of the same battery. By so doing the electric circuit will be closed over the document. The measure of the resulting current will be determined by the randomized combination of the n conductivity-variant polymers that construct this particular document. Because the source of the construction was quantum grade randomness, so is the reading of the current resulting from the particular choice of q ports and r ports: I(q,r). The authenticator will read this current, $I_a(q,r)$, and then compare it to the corresponding measurement that was carried out in the Doqumint—the Doqument manufacturing facility, $I_m(p,q)$. If the two values match: $I_a(p,q)=I_m(p,q)$ then there is a good chance that the measured doqument is indeed the same doqument that was minted in the Doqumint. This comparison will be done over a marked id. Each doqument will have a unique ID imprinted on it both visually and electronically. The authenticator will read the doqument ID, then the current $I_a(q,r)$, and then send this information to the Doqumint—the doqument manufacturer and control center. The Doqumint will perform a the comparison between the field measurement $I_a(q,r)$ and the factory measurement $I_m(q,r)$. It will notify the field authenticator of the result. If the measurements disagree then clearly the purported doqument is a counterfeit.

One measurement is not enough. The authenticator will select another group of some q' ports and against them another group of r' ports and repeat the measurement: $I_a(q',r')$. The authenticator will send the measurement result to the Doqumint, as before. The Doqumint will compared $I_a(q',r')$ to its own prior measurement $I_m(q',r')$, and will report the results. There are numerous combinations of q-ports to contrast with numerous combinations of r-ports. In other words the authenticator can perform a large number of current measurements. If the doqument is authentic then each and every measurement done by the authenticator will match the pre-recorded result of the same measurement done in the Doqumint. All these measurements are randomized because the doqument was constructed through a quantum randomness feed. These measurements are conducted extremely fast. The more measurements that are made and agree with the respective manufacturer result the greater the confidence that the doqument measured in the field is the very same article manufactured in the doqumint.

Suppose now that a counterfeiter gets hold of the manufacturer current measurements database. So they know that doqument ID X has a set of current measurements Y. Now the challenge for the counterfeiter is to construct a doqument that would give the correct measurements for each and every combination of ports divided between the two poles of the battery. As shown in the series of continued applications, this challenge is not feasible to overcome with current technology. This conclusion is very important. It implies that the manufacturer measurement database does not require secrecy. In fact it can be published on a public ledger. It can also be pre-loaded to the field authenticator device, so the field authenticator does not need to use the Internet to send over its measurement, but can rather carry out the comparison between its field measurement and the Doqumint measurement in the confines of the doqument authenticator device. It implies that a hand-held battery operated doqument authenticator will work fine, even if there is no Internet.

Once the field authenticator satisfies itself with enough measurements that the inspected doqument is genuine and not a counterfeit, it will use its data reading port and download the data captured in the CHIP, (or if the content is plainly printed, it will be read with proper credibility, since the doqument passed the test.) We recall that the chip is write-once, not a rewritable media. We also recall that the CHIP is embedded inside the doqument, so that in order to tamper with it, one has to break up the surrounding doqument material. Such breakup will disable the measurements needed for authentication. It is infeasible to crack, break, a doqument and then patch it up again and keep the same delicate current readings.

The data in the doqument chip will contain text, images, and biometrics as the case may be. This will allow for automatized access control for example. A person requesting access to a controlled area lays his palm on a palm reader, and attaches his doqument ID card to be read by the access-management apparatus. The apparatus authenticates the doqument as described above, then downloads the data from the CHIP, reads there the expected palm reading results and compares these downloaded data to the actual measurement performed on the palm of the access requesting individual. If the doqument is authenticated, and the palm readings match, then the access management apparatus grants access to the requesting individual. Similar testing can be done through fingerprint, iris reading, voice or facial recognition.

Use

In every case where people present a document to prove identity, claim a license, pass data, records—like medical history, the risk looms: is the presented document genuine? Counterfeiting is an old industry. Alas, today when the issuing government is righteous and good—counterfeiting undermines good order; it is injurious and destabilizing. Only that today technology allows amateurs to turn out convincing imitations of secure government documents.

This is especially critical for situations where the document is too temporary, or two marginal to warrant the full security measures reserved for currency and passports. These "less important" documents are much more numerous. They control temporary access, and carry all sorts of data. They are used throughout the government, in corporations, in universities, etc. The formalism of identity documents and licenses is of the greatest importance in crowded cities where people are strangers to each other, and only ascertain one's identity through a properly issued id-card, document.

In the near future the requirement for secure documents will only be greater in two important areas. In cyberspace it is easy to fake identities, so when it comes to matters of money and command it is important to hinge cyber identities on material entities proving real life identities. In healthcare, we are going towards a state where individuals will carry on their person a medical document listing allergies, medical issues, meds taken etc.

The United States faces an endemic crisis of people status. A large community of undocumented aliens is vying for counterfeit documents in order to get by. This demand fuels an international industry that supplies the need—injecting massive disorder throughout this country.

All these situations are readily cured with the doqument technology. Based on quantum randomness and nanotechnology, the doqument cannot be counterfeited using state of the art technology.

On top of its robust security, the doqument is convenient. Cards are as small as credit cards, or as big as normal reading pages. They are constructed from resilient plastic, so they can be cleaned and wiped out. They are easy to carry, and easy to hand over to an examiner. A human examiner will smartly fit the doqument in a doqumint authenticator/reader. The authentication process is so fast, there is no delay for the people involved. Same for the data reading process.

The examiner will instantly see the contents of the doqument on a viewing screen. The screen will be large for an authentication/reading station, and it would be small for a hand held authenticator/reader.

Doquments may also be implemented via a machine inspector that would accept claimed documents or grant access against a petitioner showing the doqument, then proving their identity via biometric reading.

In its simple implementation a doqument will look like a regular paper, fitting into a regular printer, and properly printed. The difference will be with respect to the construction of the page from conductive polymeric constituents.

While the plan now is only to serve the government, this robust identification technology is expected to migrate to commercial setting. Every organization, company or university has a genuine need to manage access, and acknowledge licenses to various actions. The simplicity and the robustness of the doqument will be a welcome innovation world wide.

Doqument Authentication Database

Each doqument will have its conductivity readings pre measured in the factory where it is being prepared. The database that contains all these measurements will have to be made accessible to the Doqument authenticator, via distributed ledger technology, or regular database that may be open to the public, or open to a restricted circulation of authenticators. These readings can be pre-downloaded to the authenticator apparatus so that it can authenticate doqument without live connection to the Internet. Otherwise the Doqument authenticator may send readings to a central server to get an OK signal about the examined Doqument.

Related R&D

The underlying technology for using quantum randomness to feed a 3D printing procedure to create counterfeit-resistant material contraption has been studied extensively and reported in the most respected peer reviewed journal of advanced materials. The same technology was awarded the Best Paper Award in IEMTRONICS conference conducted last September in Vancouver. In addition the principal investigator is the inventor and the IP owner of two underlying granted US patents and one world-wide patent application not yet granted.

Competing technologies include elaborate quantum markers—a very expensive and delicate technology not fit for mass market. Lamination, holographic markings are known markers used on devices, but not appropriate for documents. Also, all these technologies while they are sophisticated, are within reach of medium to high level counterfeiters. As was mentioned before the technological gap between the document preparers and the document counterfeiters is very small, and growing smaller, so just advanced technology is not the solution. The Doqumint proposal is to rely on the random impression of identity on each and every document, and on the idea that given the readings of this impressions, one cannot manufacture a specimen that would give this reading. Together these points invite a public-ledger enabled technology to be used in a cost effective way to insure authenticity of each document it is used for.

Rock of Randomness Advancement

We further investigate the idea of constructing a randomized media to be measured for configuration based conductivity via numerous combinations of ports for each pole of the battery. This technology is articulated in the continued U.S. Pat. Nos.: 10,467,522, 10,754,326.

We consider: (i) seeding a uniform 'soil', (ii) a flat rock, (iii) a fuzzy rock.

Seeding a Uniform Soil

The idea is to construct the rock from foundational media which is of mid level conductivity (a semi conductor), regarded as the 'soil', and then randomly seeding this soil with 'seeds' comprised of element of markedly different intrinsic conductivity relative to the soil. The seeds may be insulators, or conductors. They may come with a variety of shapes, variety of sizes, and seeded in randomized locations. This seeding randomness will translate to randomized readings of effective conductivity between some q poles on the rock on one hand and r poles on the rock on the other hand.

A Flat Rock

The tacit assumption was that the rock is a lump of matter. We consider a rock as a flat thin surface, like a page. This will require the electric port to be fitted on one side of the page. Then the opposite side of the page can be used to print normally some text or graphics. We are talking about a 3D printed document where the substrate is built from conductivity variants zone throughout the surface of the page. The page is then laid precisely on a measuring bed where some p ports touch the page in p well specified spots. And then the Randomness Rock procedure of picking randomly some $q<p$ ports for one ports and $r \leq p-q$ port for the other ports and measuring de-factor conductivity of the page.

Fuzzy Rocks

The rock-of-randomness technology can be implemented with a fuzzy ports. Namely, the expected reading of effective current will not be sensitive to minute changes in the location of the electric pole. This will allow for quicker testing, and for use of the technology in flexible, foldable, and curve-able, media, like a page. Fuzzy implementation would require the various conductivity zones to be of sufficient size.

The area where the port is expected would be marked by a high conductivity zone, so that attaching the electrical poll not exactly on the same spot, will not alter much the reading of effective conductivity. One would then toss a paper on a Doqument authentication device. The upper plate of the device will have room to fit the page Doqument with the p ports approximately on the same spot, and the reading will be sufficiently close to the expected reading published by the page construction company, to validate the authenticity of the page.

Paper Doqument

The Rock of Randomness technology could be used to authenticate paper like documents. Instead of regular paper the page will be prepared from a randomized mix of conductivity-variant materials according to the fuzzy reading implementation. This will allow one to build a page authenticator with an upper plate fitted with p conductivity ports. The examined page will be printed on one side, like a regular page, while the substrate will have its other side clean. That back side will be placed on the reading plate of the Doqument authenticator. The page will have its tray so that it is placed in almost exactly the same way each time. But the construction will be such that if the reading ports are slightly misplaced then it will not change the reading of the effective conductivity of the page for the selected port polarity configuration.

Materials for Document Construction

Doped polymers are natural constituents to build a doqumint. Many other options are good choices.

The conductivity specified materials will need to show conductivity distinction, should be easy to apply as a surface covering and should be durable. For applications where the document should be humanly readable the Document main ingredients should be transparent.

Conductivity Distinction

The Doqument works on n conductivity ingredients $C_1$, $C_2, \ldots C_n$. Marked so that $C_j > C_i$ for all $j > i$, $i,j = 1, 2, \ldots n$. The conductivity span of the ingredients is defined $C_s = C_n - C_1$.

Conductivity distinction is being defined through the (n−1) $C_{i+1} - C_i$ values for $i = 1, 2, \ldots (n-1)$. The smallest conductivity step from one conductivity ingredient to the next should be above a given threshold. Maximum conductivity distinction is achieved if for all values if $i = 1, 2, \ldots n-1$, the conductivity change from one ingredient to the next is one n-th part of the conductivity gap, or close to it.

$$(C_i - C_{i-1}) \sim C_s/n$$

for $i = 2, 3, \ldots n$

Geometric Design

We distinguish between one layer and two separate layers and two joint layers design. In the first case all the portal points to measure conductivity are on one side of the Doqument and there is only one side. In the other case they are on both sides of the Doqument but distinct and measured separately. In the third case the plates are connected from both sides and are measured conjointly.

For the first and second case, the challenge is as follows: given a well defined conductivity surface, let's say a rectangle—for convenience (any other shape will do). Total surface area is S. The surface is to be painted by n conductivity ingredients of conductivities: $C_1, C_2, \ldots C_n$. The surface will also be fitted with p electric portals spread within S. The n conductivity ingredients will be marked as s stains, where a stain is defined as an geometric shape within which one conductivity ingredient is painted. The stains must be connected so that from every portal to every other portal there is a pathway that completely traverses through the s stains. The value of s and the shape of the s stains is a design parameter that needs to be optimized.

The criteria for optimization may be defined in various ways. One practical way is as follows:

1. Random measurement: let one randomly select q ports, where $q < p$. Let then one randomly select r ports where $r \leq p - q$. Now let one connect the selected q ports to one side of an electric battery and then connect the r ports to the opposite side of same battery. Let one then apply an electrical current between the two groups of portals, and measure the spatial conductivity measurement $M_1(q,r)$ for this q,r setting.

Spatial conductivity is determined by the specific conductivity of the measured ingredient—the one that is normalized per the thickness of electricity transferring, and by the total pathway of the conducting media. The more of that media, the lower the measured conductivity. Spatial conductivity takes into account intrinsic conductivity and the geometry of the passed-through media.

2. Repeat step one some t times. to record $M_1, M_2, \ldots M_t$. Let $M_{min}$ and $M_{max}$ be the lowest and the highest values of the t M measurements. Let one now divide the gap $G = M_{max} - M_{min}$ into h equal size intervals $\Delta m$ of size:

$$\Delta m = G/h = (M_{max} - M_{min})/h$$

The t M measurements will now each be fitted into one of the h intervals that parcel out the gap G.

After such fitting each interval i where $i = 1, 2, \ldots h$ will be associated with $H_i$ measurements such that:

$$t = \Sigma H_i \text{ for } i = 1, 2, \ldots h$$

The flatness of the resulting histogram will be metric for the quality of the Doqument geometric design. Any of the various common ways to compute a flatness quality of a curve can be used as a metric for the quality of the Doqument surface. Flatness of the histogram makes the reading of the spatial conductivity between any two groups of portals a randomized value.

Another way to measure these metrics is by measuring how much did the reading change when one port is changed to another, and nothing else. A good design will make such a change have a string impact on the reading.

Options for Doqument Geometry

The designer needs to select the number s or stains, their shapes and their position on the measured surface, as well as location of the p portals. We discussed above metrics for judging one design versus the other. The design can be analyzed analytically or experimentally.

The larger the number p of conductivity portals, the more data points can be generated off the surface because there are more combinations of q portals associated with one electric pole versus r portals associated with the opposite pole, where $q + r \leq p$. The more critical the validation of the Doqument the larger the value of p, so it can be regarded as given.

As to the stains areas, it is the case where both extremes are suboptimal. If the stains are very big, or at least if one stain is very big, then chances are that several portals will all fall into that one large stain. This will make the results quite predictable. The geometry of the portals is known. In the extreme case, all p portals fit into a single stain of a fixed conductivity value. This will be very easily forged.

Multi-Layer Documents

Extra security will be achieved by painting the Doqument will l layers of conductivity-varied surfaces. This will mimic the three dimensional expression of this technology, and will pose a more difficult hurdle for fraudsters. The added complexity of multi-layered painting will be justified when applied to more important more critical doquments.

Special Applications

Blank Services

The Doqumint technology can be a basis for a verified documentation service. The service will offer for sale Doquments—verifiable documents in blank form. The customer will fill the document in with content, and pass them to their client. The holder of the filled in Doqument will be able to prove its identity either through a public ledger account managed by the Doqumint service, or through a private ledger held by the customer of the service.

Cash, Obligatory Notes

The Doqument technology can be used to execute obligatory notes that may be passed around like cash. Alice may obligate herself to pay Bob $1000 March 1st, and say so on a Doqument. The Doqument will further say that its holder may collect the money. This will render the Doqument into cash, to the extent that Alice is trusted. The note may be without any restrictions and thereby operate as cash (but it can't be split). High credential institutions, like stores will issue such store notes, or cash notes. The security of the note is based on the Doqument technology that would prevent counterfeiting. Alas, loss of such a Doqument note is like loss of cash. The finder will collect on it (if no restrictions are spelled out).

Overview of the Invention

This invention describes an identity-verifiable document where a recipient trusts the self-declared identity of the document, and the contents of its statements based on authentication of the document on account of measuring properties of the document and comparing these measurements to listed properties issued by the printer of the document; this being a randomized conductivity test, RCT, comprising:

(i) a material layer painted on one or two surfaces of the document, constructed as a random assembly of materials of different electric conductivity, with w spots (ports) marked on the painted surfaces in a fixed, agreed upon locations, the "randomized conductivity surface" (RCS), wherein the recipients of the document authenticates the document by applying an electric current between arbitrary set of p "plus" ports selected among the w ports, and a different arbitrary set of m, "minus" ports, such that m+p≤w, and thereby measures the effective electric resistance, R(p, m) of the document relative to the selection of the p positive (plus) and the m negative (minus) ports, and then comparing R(p,m) to a listed value for this measurement issued by the printer of the document, then repeating such measurement over different groups of positive and negative ports, for arbitrary number of measurements, then concluding, upon agreement between all measurements to their respective document printer listed values, that the document is authentic.

The invented document is also used where the randomized conductivity surface is painted on the back side of the document while the front side features the content of the document, the "payload", the identity of the document and the statements expressed in the payload are trusted if the randomized conductivity surface on the back side of the document passes the randomized conductivity test.

The invented document in is also used where the randomized conductivity surface is painted on the front side of the document, and is transparent so that the contents of the document is seen through the layer of randomized-conductivity surface, the identity of the document and the statements expressed in the payload are trusted if the transparent randomized conductivity surface on the front side of the document passes the randomized conductivity test.

The invented document in is also used where a first randomized conductivity surface is painted on the back side of the document and where a second randomized conductivity surface is painted on the front side of the document, and is transparent so that the contents of the document is seen through the layer of the second randomized-conductivity surface, the identity of the document and the statements expressed in the payload are trusted if the first randomized conductivity surface on the back side of the document passes the randomized conductivity test, and if also the second randomized conductivity surface on the front of the document passes the randomized conductivity test.

The invented document in is also used where the two randomized conductivity surfaces are connected via small holes in the document material between the two randomized conductivity surfaces, and conductivity tests are conducted between arbitrary p' ports selected from the 2w ports from both surfaces, and between arbitrarily selected m' ports from the 2w ports from both surfaces, such that p'+m'≤2w and where the p' are all connected to the "plus" pole of an electric circuit and the m' ports are connected to the "minus" pole of same electric circuit.

The invented document in is also used where the randomized conductivity surface comprises t layers of randomly randomized conductivities, such that each layer is independently randomized from the other.

The invented document in is also used where an electronic chip is placed under the randomized conductivity surface such that the randomized conductivity surface has holes fitted over the reading terminals of the chip, so that if the document is authenticated through the randomized conductivity test then the contents of the chip is read through the chip terminal and trusted.

The invented document in is also used where the chip contains biometric data of a given individual, and where an identity verification station comprises (i) a randomized conductivity document authenticator, (ii) a chip reader, and (iii) a biometric reader reading biometric data from an individual claiming to be the individual identified in the document, and where upon authentication of the document, and agreement between the biometric data read from the chip and the biometric data collected from the individual, the identity verification station trusts the identity of the tested individual, and issues a statement of this trust, while in case of disagreement between the data on the chip and the data measured from the tested individual the station issues a statement of rejection of the tested individual being the individual referred to in the document.

The invented document in is also used where the manufacturing thereto is carried out through a conductivity surface painting apparatus (CSPA) wherein n painted media ingredient, "paints" have n different conductivities $C_1, C_2, \ldots C_n$ such that $C_i < C_{i+1}$ for i=1, 2, ... (n−1), and where a randomness source determines the distribution of the n paints on the randomized conductivity surface.

The invented document in is also used where an arbitrary paint, j of conductivity $C_j$ is painted as a background paint on the randomized conductivity surface, and where the other (n−1) paints are painted on top of the background as s closed surfaces, "stains", of randomized shapes and randomized sizes, so as to secure a randomized reading of the effective conductivity when p positive ports are selected and m negative ports are selected.

The invented document in is also used where the paints are polymers with various degrees of doping such that each paint has a distinct conductivity, although that apart from the doping the chemical structure of the various paints is the same.

The invented document in is also used where the paints are metals of different degrees of conductivity.

The invented document in is also used by a service that offers blank documents to document customers who will fill the blank document with content, and pass the filled in document to their clients, and these clients, present the filled in document to third party which verifies the authenticity of the presented document based on a dialogue the third party executes with the service, or based on document authentication parameters published by the service.

The invented document in is also used as an obligatory note claimable by the holder of the document, which makes the document equivalent to a bank note, to the extent that the note writer is trusted to honor the note.

What is claimed is:

1. A system comprising:
   a document, wherein the document has a physical rectangular entity having specified thickness, length, and width, imprinted with distinguishing humanly readable markings;
   the document is being constructed as t flat, dove-tailed sections, where each section is one of n possible polymers of similar properties, except that each of those n polymers is doped with different measure of a conductive metal element and as a result each polymer i, for i=1,2, . . . n has a unique conductivity $C_i$;
   the t sections have arbitrary shapes and arbitrary sizes, wherein the t sections are attached to each other without open space therebetween,
   the shapes and the sizes of the t sections is determined by a computing device guided by random data as input;
   the face of the document is marked in m specified locations by electrical ports;
   the document is being placed on a document reader-recorder, wherein the document reader-recorder measure electrical conductivity and perform related computation;
   the document reader-recorder is connected to the m ports;
   the document reader-recorder measures electrical resistance, $R(p,q)$ between arbitrary $p \subset m$ ports that are being connected to the positive terminal of a battery placed inside the document reader-recorder, and different arbitrary $q \leq m-p$ ports that are being connected to the negative terminal of the battery; and since the shapes and sizes of the t sections is randomized, so is the value of $R(p,q)$;
   the measurement of $R(p,q)$ is repeated r times, each time with a distinct selection of the p ports and the q ports, so that no two measurements are conducted over the same set of p ports and q ports;
   the r measurements are being listed on a public ledger L;
   thereby the document is readied for distribution;
   the document is sent to a destination where the system performs an identity verification action to verify that the document at hand is the document identified in the public ledger, L;
   the verification process is carried out by placing the document on a reader-verifier, which is built as a part of the document reader-recorder, with an addition of a verification element, V;
   the reader-verifier is taking arbitrary v r measurements $R(p,q)$;
   the V part of the reader-verifier is then comparing the v measurements with the corresponding values listed in the public ledger L;
   if the comparison is in the affirmative, then the reader-verifier is issuing a trust statement: expressing trust that the measured document is the one identified in the public ledger.

2. The system in claim 1 wherein the document is prepared by painting one surface of the document with a paint comprising n paint variants P1, P2, Pn where each paint variant has a different electric conductivity C: $C_i \neq C_j$, for i,j=1,2, . . . n for all i≠j, and where the painted surface is comprised of s=t sections which are bounded areas, called stains, and where the stains cover the entire painted surface, and where each stain is of an arbitrary shape, and of an arbitrary size, and each stain comprising one of the n paint variants, randomly selected;
   the m ports are marked on the painted surface,
   and where a measurement x of the painted document is being executed by the reader-verifier as follows:
   (i) arbitrarily specifying p<m ports on the painted surface, this group is called the positive group,
   (ii) arbitrarily specifying q≤m−p different ports on the painted surface, this group is called the negative group,
   (iii) connecting the positive group to the positive terminal of the battery, and
   (iv) connecting the negative group to the negative terminal of the battery, thereby
   (v) measuring the effective electrical resistance $R=R(x)=R(p,q)$ between the two groups, (conductivity test);
   repeating the process (i)-(v) v times, without repeating the exact selection of the positive group and the negative group, and thereby listing v measurements of the painted document, each measurement is expressed in a numeric reading;
   this sequence of actions is executed by the reader-recorder and by the reader-verifier.

3. The system in claim 2 where a second painted layer prepared as the first layer, is applied on top of the first layer, a third layer, also prepared as the first layer, is applied on top of the second layer, and so on for t layers, painted one on top of the other, the m ports are marked only on the upmost surface.

4. The system in claim 2 wherein an electronic chip is placed under the painted layer, the chip containing non-rewriteable data, and where the terminals of the chip are accessible via holes drilled in the painted surface, and where if the document is authenticated then the data drawn from the chip through its exposed terminals is also authenticated.

5. The system in claim 4 where the chip in the document contains biometric data of a given (tested) individual, and where an identity verification station is used to verify and authenticate the individual carrying the document the identity-verification station comprising (i) the, reader-verifier, (ii) a chip reader, and (iii) a biometric reader;
   the system is reading biometric data from the tested individual claiming to be the individual identified in the document, and where upon authentication of the document, and agreement between the biometric data read from the chip and the biometric data collected from the tested individual, the identity verification station concludes that the tested individual is the individual identified in the document, while in case of disagreement between the data on the chip and the data measured from the tested individual the identity verification station concludes that the tested individual is not the individual identified in the document.

6. The system in claim 2 where the paint variants are metals of different degrees of conductivity.

7. The system in claim 1 where the painted randomized conductivity surface is painted on the front side of the document, and is transparent so that the contents of the document is seen through the painted layer.

8. The system in claim 7 where a second painted layer is applied to the back side of the document, and where each painted surface has its own set of numerically expressed properties.

9. The system in claim 8 where the two surfaces are connected via small holes in the painted surfaces and conductivity tests are conducted between arbitrary p' ports selected from the 2m ports from both surfaces, and between arbitrarily selected q' ports from the 2m ports from both surfaces, such that $p'+q' \leq 2m$ and where the p' ports are all connected to the "plus" terminal of the battery, and the q' ports are connected to the "minus" terminal of the battery.

10. The system in claim 7 where the document contains writings declaring the document to be of a specific monetary value, and where upon authenticating the document, it is trusted for the amount of money written on it.

\* \* \* \* \*